Dec. 29, 1964  R. E. DARLING  3,163,707
NON-STRETCH FLEXIBLE TUBE WITH CONDUCTORS THEREIN
Filed Dec. 27, 1962  3 Sheets-Sheet 1
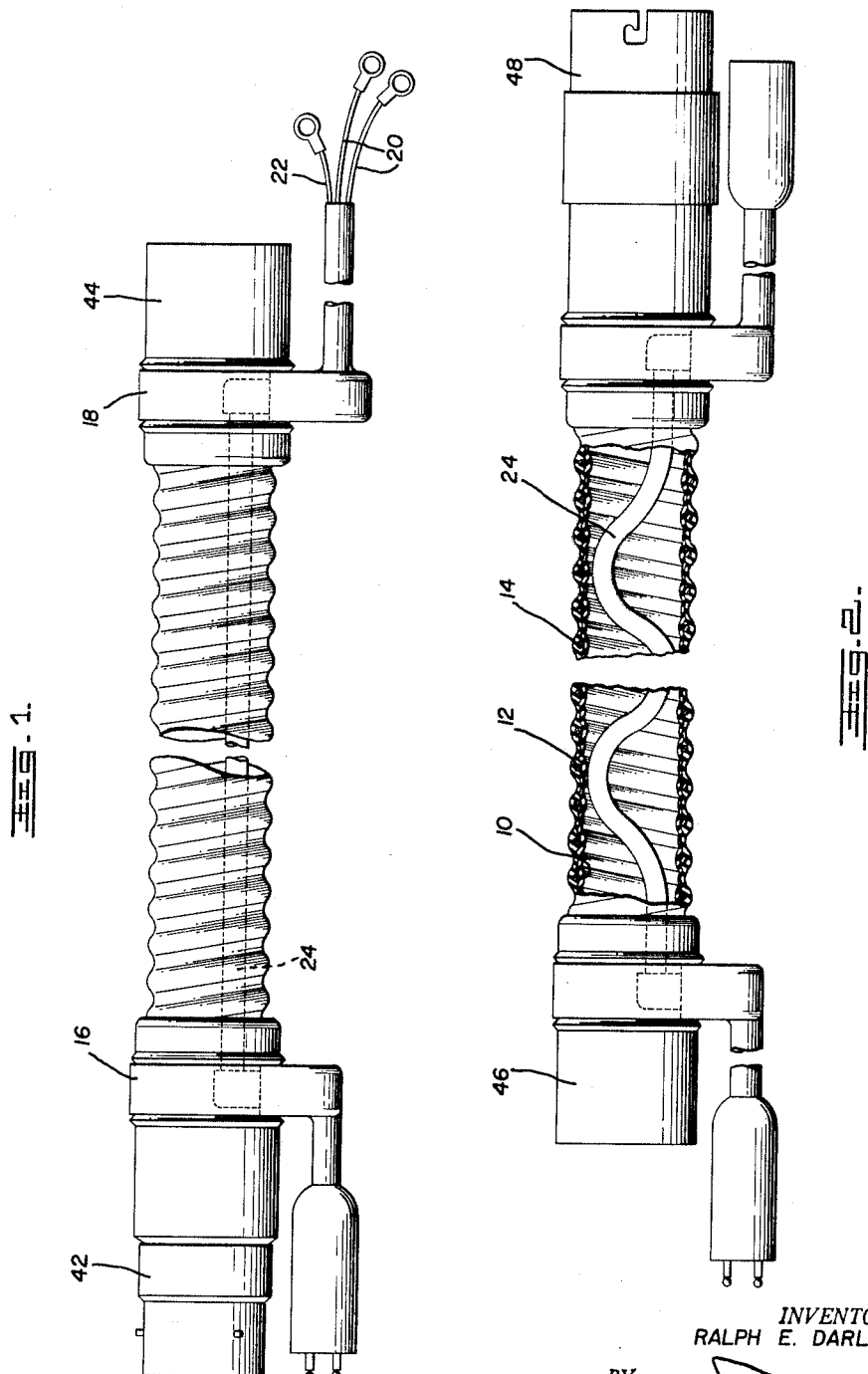
INVENTOR.
RALPH E. DARLING
BY
ATTORNEYS

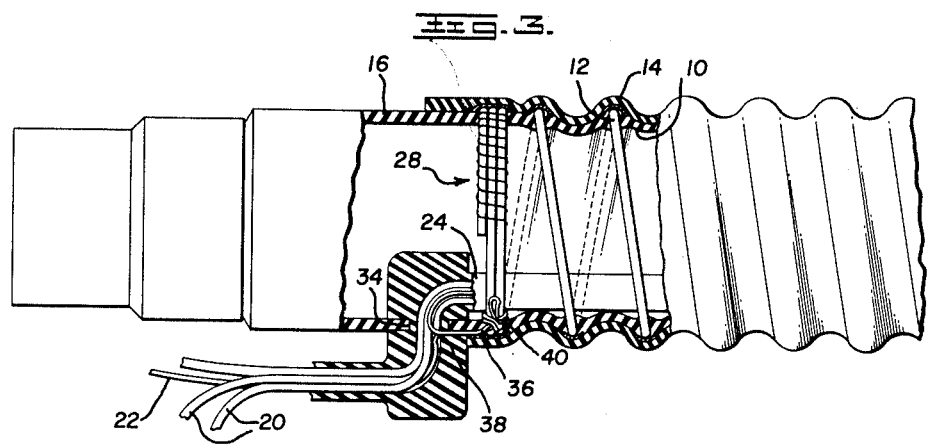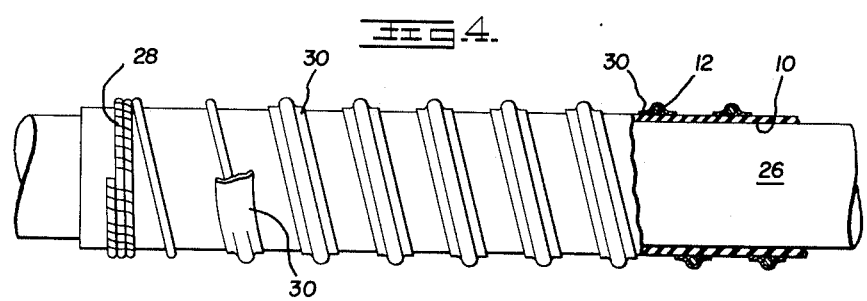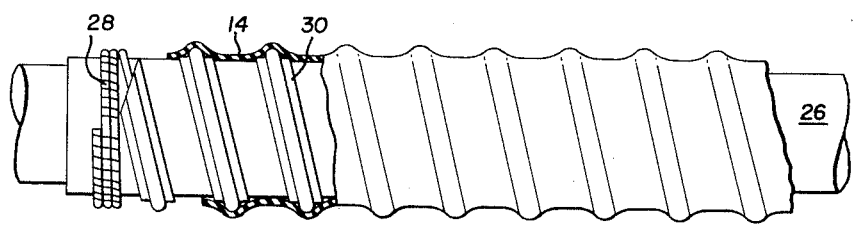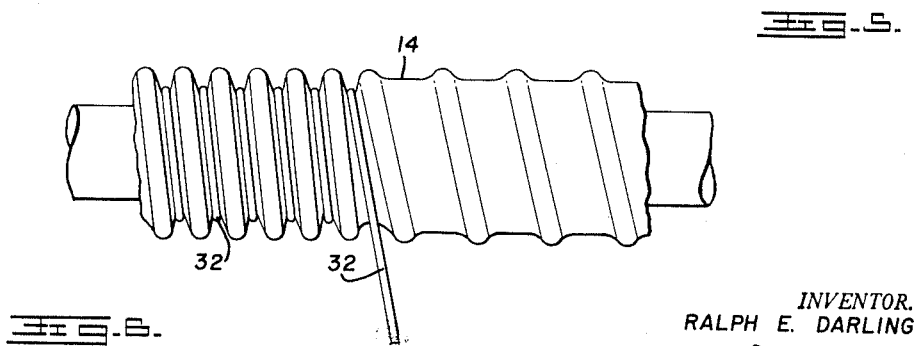

Dec. 29, 1964    R. E. DARLING    3,163,707
NON-STRETCH FLEXIBLE TUBE WITH CONDUCTORS THEREIN
Filed Dec. 27, 1962    3 Sheets-Sheet 3

SECTION

INVENTOR.
RALPH E. DARLING
BY
Pattison, Wright and
Pattison
ATTORNEYS

United States Patent Office 3,163,707
Patented Dec. 29, 1964

3,163,707
NON-STRETCH FLEXIBLE TUBE WITH CONDUCTORS THEREIN
Ralph E. Darling, 7805 Fairfax Road, Bethesda, Md.
Filed Dec. 27, 1962, Ser. No. 247,722
12 Claims. (Cl. 174—47)

The present invention relates to flexible tubing and more particularly and specifically to an impervious flexible tube for use, by way of example, as a conduit for oxygen breathing and anaesthetizing apparatus, and to a method of its manufacture.

This application constitutes a continuation-in-part of co-pending application Ser. No. 783,518, filed December 29, 1958, and now abandoned.

Flexible tubing of the general type herein disclosed has been widely used in conjunction with oxygen breathing apparatus for aircraft pilots and personnel. Such tubing is used in aircraft to connect personnel helmets or headgear with a central oxygen source aboard the aircraft, and, in cases of emergency, with portable sources of oxygen carried by the personnel or by their bail-out or ejection apparatus.

It has been discovered that oxygen tubing for aircraft use must meet specific minimum requirements relative to flexibility, non-kinking characteristics and cross-sectional resistance to crush. It has been further discovered, however, that upon ejection or bail-out of aircraft personnel the flexible character of oxygen tubing now known and used permits excessive and undesirable axial elongation or expansion of the tubing under the air stream resistance encountered. Such elongation, coupled with the movement of the personnel through the air stream, results in whipping and lashing of the tubing to the danger and peril of the ejected personnel.

It has also been a requirement of flight personnel oxygen equipment that the helmets or headgear worn be connected to a source of electrical energy to power communication equipment, heaters, and the like. Certain efforts have been made to carry electrical circuits along the course of oxygen tubing to the headgear, either within the walls of the tubing or externally contiguous therewith. However, it has been found that wiring within the tubing walls is unsatisfactory by reason of breakage thereof resulting from fatigue and stress produced by repeated flexing and twisting of the tubing. Also, external wiring along the length of the tubing has been unsatisfactory for like reasons and for the further reason that it presents an entangling obstacle to free movement of the tubing.

It is a general object of this invention to provide an impervious tube which is flexible, non-kinking and non-collapsible under severe conditions of stress, strain and external force.

A principal object of this invention rests in the provision of a novel flexible tube having the aforestated physical attributes yet which provides for a fixed limit of elongation of the tube under extreme axial stretch.

Another object of the instant invention lies in the provision of a tube having those aforestated characteristics which serves as a carrier for a multiple of electrical circuits longitudinally thereof and insulated from the interior passage therein.

Still another and further object of this invention resides in the provision of a novel method of manufacturing a wired tube of the character described.

A still further object of this invention is the provision of a tube of the character described, and a method for its manufacture, which enables the production of a light-weight, minimal cost, stable conduit meeting all of the critical performance standards dictated by its use in conjunction with life-preserving equipment.

Still additional objects and advantages of this invention will become more readily apparent to those skilled in the art when the following description is read in the light of the appended drawings.

The nature of the present invention may be stated in general terms as relating structurally to a flexible conduit consisting of a tube of elastomeric composition having a continuous helical corrugation, a helical metallic reinforcing strip longitudinally of the tube in registry with the outer crests of the helical corrugations, an outer sheath covering and conforming to the inner tube and reinforcing strip, plural electrical conductors extending coaxially of the bore of the inner tube, and restraining means being tied to the remote ends of the reinforcing strip; and, relating to a method for manufacturing a flexible tube including the steps of applying a reinforcing strip about a tube of elastomeric composition, longitudinally expanding the reinforcing strip and securing the ends thereof to the tube adjacent its ends, applying an outer tubular sheath over the reinforcing strip and inner tube, corrugating the assembled unit, partially setting the unit, inserting a restraining cord coaxially of said tube, extracting the ends of the cord through the tube wall one adjacent each end coil of the reinforcing strip and tying the cord to the end coils of the strip, sheathing said electrical connectors and said restraining cord in an elastomeric tube, and finally setting the composite unit.

Referring now to the accompanying drawings in which like numerals designate similar parts throughout the several views:

FIG. 1 is a side elevation of a finished tube constructed in accordance with the present invention;

FIG. 2 is a view similar to FIG. 1 of a modified tube shown in partial section;

FIG. 3 is an enlarged fragmentary elevation in partial section of one end of the inventive tube;

FIG. 4 is a side elevation in partial section of one step in a method of manufacture of the novel tube;

FIG. 5 is a side elevation in partial section of another step in a method of manufacture of the novel tube;

FIG. 6 is a view similar to FIG. 5 of a still further step in a method of tube manufacture;

Figure 7:
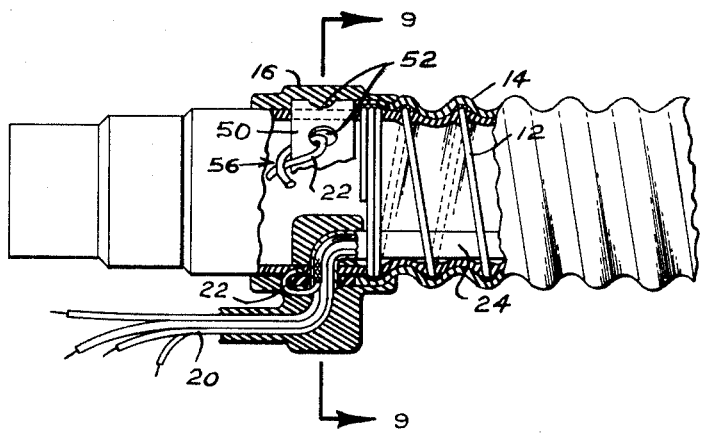
FIG. 7 is a view similar to FIG. 3 of a modified form of the invention.

The novel tube constituting the present invention, in part, is illustrated by way of example as comprising an inner cylindrical tube 10 of rubber of like impervious, elastomeric material surrounded by a helical spring 12, and an outer sheath 14 encasing the spring and inner tube, wherein the inner tube and outer sheath are corrugated intermediate the convolutions of the spring and the resulting unit is vulcanized or cured in such corrugated condition.

Further, in addition to end fittings 16 and 18 adapted to receive connectors of selective design, the tube is provided with plural contiguous electrical leads or conductors 20 and restraining cords 22 extending coaxially of the bore of the inner tube 10 and projecting outwardly, radially through the side walls of the end fittings 16 and 18. The conductors 20 and cords 22 are encased in a continuous sheath 24 of rubber or elastomeric material within the inner tube 10 and for a spaced distance outwardly from each of the two end fittings 16 and 18.

As is best seen in FIG. 3, the restraining cords 22 are tied to the end coils of the spring 12 by loop sections thereof lying between the inner tube and outer sheath, said tied loops serving to define an intermediate cord section which interconnects the end coils of the spring. The final curing of the composite tube, as to be hereinafter described, serves to seal the joints in and about the points of projection of the sheath 24 through fittings 16 and 18 to provide an impervious, gas-tight conduit intermediate the extreme open ends of the end fittings of the tube and to provide completely sealed electrical conductors within the bore of the conduit.

By way of more definitive detail, the novel flexible tube constituting a concept of this invention may be manufactured by certain method steps (FIGS. 4, 5 and 6) which have been determined to produce the novel and useful product. For example, I can utilize a section of partially cured, elastomeric tube 10 which I stretch longitudinally over a mandrel 26 to a predetermined elongation less than the elastic limit of the tube. Securing the stretched tube to the mandrel, I then apply a preformed metallic helical spring 12 of predetermined length telescopically over the tube and mandrel expanding the spring longitudinally to a preselected position of stretch and securing the end coils 28 of the spring to the tube. I then secure the intermediate convolutions of spring 12 to the outer wall of the tube 10 by an adhesive tape 30, wound convolutely thereover, or, I cement the spring to the tube wall. The next step is to place a tubular sheath 14 of fabric or elastomeric material over the tube 10 and spring 12 in a tight fitting condition thereon, whereupon the unit is then transferred to a smaller mandrel and corrugated by roping down the sheath and tube through tight winding application of nylon cord or wire 32 between the convolutions of the spring. The unit is then partially cured or vulcanized while so roped.

I have found that it is desirable, to facilitate handling and working of the hose in its manufacture and to enhance desired physical characteristics of the final hose, to bind the last two and one-half or so convolutions of the spring 12 at each end thereof together to form the end coil rings designated 28 which are initially cemented or taped on the inner tube during its manufacture.

Next, a wiring unit which consists of electrical conductors 20 and non-elastic restraining cords 22 sheathed in a reinforced tube having an elastomeric, impervious cover is snaked coaxially through the bore of the corrugated unit aforedescribed and the extreme ends of the sheathed conductor is withdrawn radially outwardly through openings 34 in the walls of the tube beyond the ends of the helical spring. At this time the outer sheath 14 of the composite tube unit is rolled back to expose the end coils 28 of the spring, whereupon continuous looped portions 36 of the restraining cords in the conductor tube are extracted radially of the conductor tube walls at points immediately outside the walls of the corrugated tube, as at 38 (FIG. 3), where such looped portions are each tied as at 40 to the adjacent end coil of the helical spring.

Lastly, the ends of the covering sheath 14 of the corrugated tube are drawn out taut and the ends of the tube are placed in molds where pouring and final curing serve to form specified end fittings 16 and 18 and to seal the joints at the points where the conductor tube projects through the walls of the end fittings. This molding and curing operation further serves to bond the covering sheath 14 of the corrugated tube to the inner tube 10 about the end coils 28 of the spring.

In the embodiment of the present invention shown in FIG. 1 of the drawings it is seen in dotted line therein that the sheathed electrical conductor 20 is normally positioned in taut condition coaxially of the bore of the tube. A tube constructed in accordance with the structure of this embodiment would be completely restrained by said conductor tube and its incorporated non-elastic cords against any longitudinal elongation under any degree of axial stretch. Further, the end connectors on the tube shown would include a male plug 42 at one end and a female coupling 44 on the other. The number of electrical circuits carried in the conductor would be optional with the desired purposes for which the corrugated tube would be used.

In FIG. 2 a modified embodiment is shown wherein a predetermined length of slack is left in the sheathed electrical conductor 20 intermediate the points of its projection through the corrugated tube end fittings thereby permitting a predetermined elongation of the corrugated flexible tube under axial stress. In order to avoid a massed obstruction to gas or fluid flow in the bore of the corrugated tube, the slacked portion of the sheathed conductor may be formed with a preset spiral (FIG. 2) to cause it to assume a fixed, regular pattern wtihin and convolutely adjacent the walls of the inner tube 10 of the corrugated member. Again, in this form, the end connectors 46 and 48 are of different design and the number of circuits carried in the sheathed conductor is selective.

In providing for restraint against the axial seperation of the end coils of the reinforcing spring it is fully contemplated that modifications of the hereinbefore described construction could be utilized without departing from the inventive concepts. For example, a single restraint cord could be run from externally of one end of the tube throughout the other within the coaxial, inner tube, and separate tie cord pieces, as opposed to loop sections, could be used to tie the restraint cord to the end coil rings of the spring.

Figure 8:
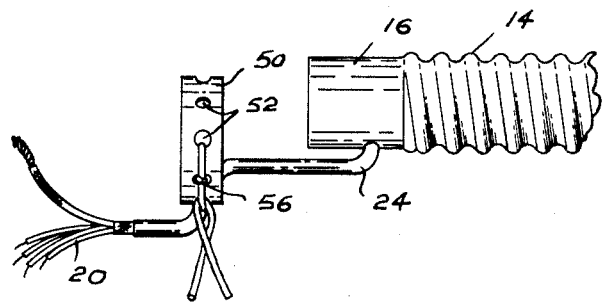
FIG. 8 is a side elevation of the tube carcass and ring insert prior to molding assembly.
Figure 9:
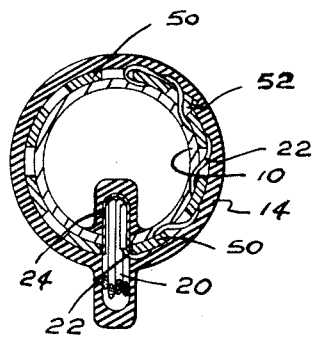
FIG. 9 is a vertical section taken on line 9—9, FIG. 7.

In FIGS. 7–9, a modified embodiment of the invention concept is disclosed. In this modified form it is seen that the tube construction is substantially identical in all respects to that hereinbefore described with the principal exception being in the addition of a metallic insert ring 50 within each of the molded end fittings 16 and 18.

The metallic ring 50 consists of a collar having an inside diameter slightly greater than the outside diameter of the coiled spring 12, and the collar is provided with a series of radial openings 52 spaced thereabout. The collar preferably has a transverse crush resistance characteristic equivalent to or exceeding that of the coiled spring. In manufacture and assembly of the tube or hose embodying the collars 50, the sheath 24 containing the electrical conductors 20 and restraining cords 22, after being snaked through the partially completed tube, is extracted axially of each of the semi-cured end sections 16 and 18 of the tube carcass, as at 54 (FIG. 8). Each end of the sheath is then threaded through one of the radial openings 52 in a collar 50 from within the collar outward, and the collar is moved up on the sheath to a position where the collar surrounds the uncured tube end. The restraining cords 22 are extracted through the wall of the sheath within the collar and are threaded through adjacent openings 52 in the collar and securely tied to the collar as at 56.

The end fittings 16 and 18 are then cured in finishing molds which serve to encase the collars as integral components of the tube wall and end fitting formations. This structure provides a direct tie between the axially spaced collar components of the tube or hose limiting the possible axial elongation thereof.

From the foregoing it is readily seen that a tubular conduit or hose has been provided which is flexible, non-kinking and highly resistant to radial compressive forces, yet a tube which may be manufactured to selectively limit or restrict longitudinal elongation. It is further seen that the novel tube herein described acts as a carrier for electrical circuits needed to activate equipment normally incident to oxygen-breathing headgear and the like within the tube which is completely sealed and insulated away from the gases or liquids conducted therein and which avoids use of external wiring which is always subject to entanglement and obstruction to free movement of the tube.

It is to be noted that the exact details of construction herein disclosed are for purposes of illustration, not limitation, and modifications encompassed by the inventive concepts are fully contemplated.

In the foregoing description certain terms have been used for brevity and clearness of understanding, but no unnecessary limitations are to be implied therefrom beyond the restriction required by the prior art.

Having now described the invention, including the construction of the tube and its method of manufacture, and the advantageous new and useful results obtained by the inventive concepts hereof, what is desired to be claimed is:

1. A flexible tube comprising a corrugated impervious carcass of non-metallic material, rigid reinforcing means embedded in said carcass along the length thereof, and means freely supported between and interconnecting the remote ends of said reinforcing means restraining said remote ends against separation axially of said tube.

2. A flexible tube comprising a corrugated impervious carcass of non-metallic material, a metallic reinforcing means embedded in said carcass helically along the length thereof, and means freely supported between and directly interconnecting the remote ends of said helical reinforcing means restraining said remote ends against separation axially of said tube.

3. A flexible tube comprising, a corrugated impervious carcass of non-metallic material, a helical spring embedded in the outer crests of the corrugated carcass along the length thereof, and means freely supported between and interconnecting the end coils of said spring restraining said remote ends against separation axially of said tube.

4. A structure as defined in claim 3 wherein an impervious sheath extends coaxially of said carcass, and electrical conductors are contained within said sheath.

5. A structure as defined in claim 3 wherein an impervious sheath extends coaxially of said carcass, the ends of said sheath projecting radially through said carcass adjacent each end of the carcass, and electrical conductors extending though said sheath.

6. A flexible tube comprising an impervious corrugated carcass of elastomeric composition, a helical spring embedded in the outer crests of the corrugated carcass along the length thereof, an elastomeric tube extending longitudinally of and within said carcass, the ends of said tube projecting radially through said carcass adjacent the ends of the carcass, electrical conductors and non-elastic cords extending through said tube, and said non-elastic cords each being tied between the remote ends of said spring.

7. A flexible tube comprising a corrugated impervious carcass of non-metallic material, a partially expanded coil spring embedded in the outer crests of the corrugated carcass along the length thereof, and the end coils of said spring being directly interconnected independently of the intermediate coils to limit further expansion of the spring axially of the carcass.

8. A flexible tube comprising, a corrugated impervious carcass of non-metallic material, a partially expanded metallic coil spring embedded in the outer crests of the corrugated carcass along the length thereof, and a non-extensible cord extending coaxially of the carcass and tied between the remote end coils of the spring.

9. A flexible tube comprising, a corrugated impervious carcass of non-metallic material, a helical spring embedded in the outer crests of the corrugated carcass along the length thereof, and non-extensible means interconnecting the remote ends of said spring axially thereof; whereby said non-extensible means absorbs axial stresses tending to elongate said tube.

10. A flexible tube comprising, a corrugated impervious carcass of non-metallic material, a helical spring embedded in the outer crests of the corrugated carcass along the length thereof, and flexible non-extensible means interconnecting the remote ends of said spring axially thereof; whereby said non-extensible means absorbs axial stresses tending to elongate said tube.

11. A flexible tube comprising, a corrugated impervious carcass of non-metallic material, a helical spring embedded in the outer crests of the corrugated carcass along the length thereof, an impervious sheath extending longitudinally within said carcass, the ends of said sheath projecting radially through said carcass adjacent each end of the carcass, electrical conductors and restraining cords extending through said sheath, and said restraining cords being tied to the end coils of said helical spring.

12. A flexible tube comprising, a corrugated impervious carcass of non-metallic material, rigid collar members having spaced radial openings therein formed integrally in said carcass adjacent the remote ends thereof, an impervious sheath extending longitudinally within said carcass and projecting radially through said collars and carcass adjacent the carcass ends, electrical conductors and restraining cords extending through said sheath, and said restraining cords emerging from said sheath adjacent each end collar and being looped and tied through the radial openings in said collars.

References Cited in the file of this patent

UNITED STATES PATENTS

| | | |
|---|---|---|
| Re. 24,468 | Roberts | May 6, 1958 |
| 2,176,762 | Forbes | Oct. 17, 1939 |
| 2,516,864 | Gilmore et al. | Aug. 1, 1950 |
| 2,560,853 | Eickmeyer et al. | July 17, 1951 |
| 2,602,608 | Darling | July 8, 1952 |
| 2,733,734 | Woodward et al. | Feb. 7, 1956 |
| 2,917,568 | Moorman et al. | Dec. 15, 1959 |
| 2,999,497 | Hamilton | Sept. 12, 1961 |